United States Patent
Yanagisawa et al.

(10) Patent No.: US 7,295,290 B2
(45) Date of Patent: Nov. 13, 2007

(54) COHERENT LASER RADAR

(75) Inventors: Takayuki Yanagisawa, Tokyo (JP);
Syuhei Yamamoto, Tokyo (JP);
Yoshihito Hirano, Tokyo (JP);
Shumpei Kameyama, Tokyo (JP);
Toshiyuki Ando, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 341 days.

(21) Appl. No.: 10/520,128

(22) PCT Filed: May 30, 2003

(86) PCT No.: PCT/JP03/06874

§ 371 (c)(1),
(2), (4) Date: Jan. 3, 2005

(87) PCT Pub. No.: WO2004/106971

PCT Pub. Date: Dec. 9, 2004

(65) Prior Publication Data

US 2006/0071846 A1   Apr. 6, 2006

(51) Int. Cl.
*G01C 3/08* (2006.01)
(52) U.S. Cl. .................... 356/5.15; 356/5.01; 356/5.14
(58) Field of Classification Search ............... 356/4.01, 356/5.01, 5.15, 28, 342; 359/333–334, 341.1
See application file for complete search history.

(56) References Cited

U.S. PATENT DOCUMENTS 2,882,395 A * 4/1959 White .................. 455/145

(Continued)

FOREIGN PATENT DOCUMENTS

JP     2000-31903 A    1/2000

(Continued)

OTHER PUBLICATIONS

Optics Letters, Vo.26, No. 16, pp. 1262-1264 Aug. 15, 2001.

(Continued)

*Primary Examiner*—Isam Alsomiri
(74) *Attorney, Agent, or Firm*—Birch, Stewart, Kolasch & Birch, LLP

(57) ABSTRACT

To obtain a coherent laser radar device that realizes high reliability and the high output of a transmitted light, the device includes a first optical coupler that branches a laser beam from a laser source into two lights, a local light and a transmitted light, an optical modulator that modulates the transmitted light, a space type optical amplifier that amplifies the modulated transmitted light, a transmitting/receiving optical system that applies the amplified transmitted light toward a target and receives a scattered light from the target, a transmitting/receiving light splitting device that splits the transmitted light and the received light, a second optical coupler that mixes the local light and the split received light together, a photodetector that detects heterodyne of a mixed light, a beat signal amplifier that amplifies a detected signal, a signal processing device that processes an amplified signal, and a display device that displays a processed result. The first and second optical couplers and an optical modulator are structured by polarization maintained type optical elements, and an optical path that extends from the laser source to the space type optical amplifier through the first optical coupler, an optical path that extends from the transmitting/receiving light splitting device to the photodetector through the second optical coupler, and an optical path that extends from the first optical coupler to the second optical coupler are connected by polarization maintained type single mode optical fibers.

10 Claims, 8 Drawing Sheets

U.S. PATENT DOCUMENTS

| | | | |
|---|---|---|---|
| 4,552,456 A * | 11/1985 | Endo | 356/5.06 |
| 6,760,160 B2 * | 7/2004 | Zhang et al. | 359/629 |
| 6,765,654 B2 | 7/2004 | Asaka et al. | |
| 6,860,350 B2 * | 3/2005 | Beuhler et al. | 180/167 |
| 2004/0150810 A1 * | 8/2004 | Muenter et al. | 356/5.01 |

FOREIGN PATENT DOCUMENTS

| | | |
|---|---|---|
| WO | WO-99/21394 A1 | 4/1999 |
| WO | WO-01/20733 A1 | 3/2001 |

OTHER PUBLICATIONS

11th Coherent Laser Radar Conference (Malvern, Worcestershire, UK, Jul. 2001) Proceedings pp. 144-146.

* cited by examiner

FIG. 5
(a) TRANSMITTED LIGHT
(b) PUMPING LIGHT
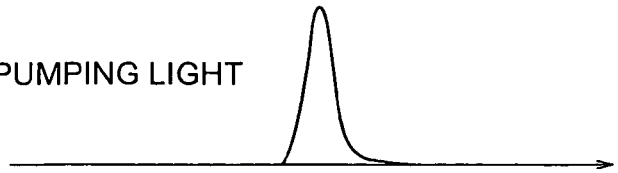
TRANSMITTED LIGHT
(AFTER BEING AMPLIFIED)
(c)
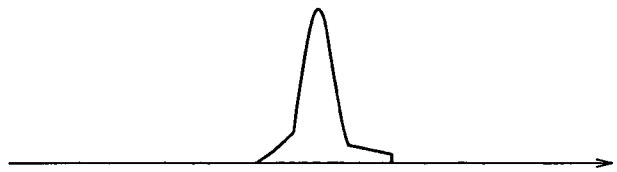
FIG. 6
(a) TRANSMITTED LIGHT
(b) PUMPING LIGHT — PULSE JITTER
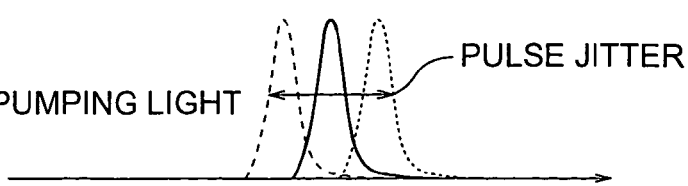

FIG. 7
(a) TRANSMITTED LIGHT
(b) PUMPING LIGHT
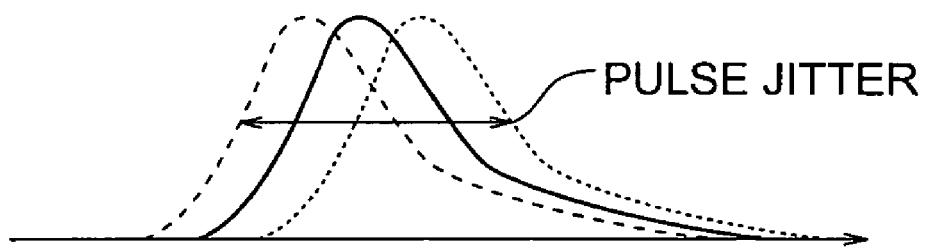
(c) TRANSMITTED LIGHT
(AFTER BEING AMPLIFIED)
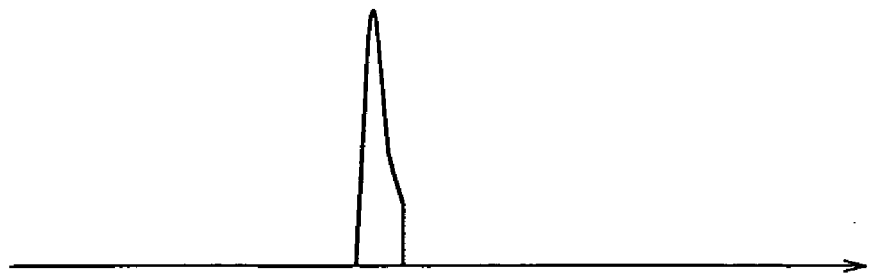

COHERENT LASER RADAR

TECHNICAL FIELD

The present invention relates to a coherent laser radar device, and more particularly to an optical fiber type coherent laser radar device in which optical parts are connected to each other by optical fibers for the purpose of measuring physical information such as a distance to a target, a velocity, a density distribution, or a velocity distribution.

BACKGROUND ART

A laser radar applies a laser beam onto a target (atmospheric air, fine grains or aerosols in the atmospheric air, constructs, or the like) from a remote place and receives a reflected light (scattered light) from the target, thereby making it possible to measure diverse information such as fine grains in the atmospheric air, the distribution of molecules, the velocity of wind, or a distance to a construction, from the remote place.

In most cases, the laser radar is employed outdoors, and requires a high reliability. Also, in order to measure information that pertains to a remote place with high precision, there is required a large output and a beam quality of diffraction limit. Further, a coherent laser radar that detects the velocity of wind or a velocity of an object to be measured requires a single frequency for a transmitted light because of the detection of a slight Doppler frequency shift of a scattered light, as well as requires a long pulse width to obtain a high velocity resolution. In addition, in the event of using the laser radar outdoors, the safety of human eyes is required. A laser beam having a wavelength of 1.4 μm or longer is called "eye safe wavelength" which is large in the tolerance for the eyes. Therefore, the use of a laser beam having a wavelength of 1.4 μm or longer makes it possible to achieve both of the large output and the safety of the eyes.

For example, in a conventional spatial resonator type coherent laser radar device that is disclosed in Optics Letters, Vol. 26, No. 16, p 1262 to 1264 (2001), there is employed a space type laser radar resonator in which a laser resonator is disposed in a space by using an Er, Yb: Glass laser medium that oscillates at a wavelength of 1.54 μm and an optical part such as a mirror.

Moreover, to achieve the unification of frequencies, there is used an injection seeding method in which a local light is injected into the resonator, and a laser oscillation is generated at the same frequency as that of the local light, and a resonator length control for conforming a longitudinal mode of the laser resonator to the wavelength of the local light.

In addition, to capture a longer pulse width, a space type laser resonator having a longer resonator length (2 m) has been used.

However, a laser medium that oscillates at a wavelength of 1.4 μm or longer has difficulty in generating a laser beam with a high efficiency because of a small gain in general. Also, in the space type laser resonator, the optical parts such as a mirror requires a high precision in the installation, and in the laser radar device that is used outdoors in most cases, the parts are readily out of alignment which arises from a change in temperature, vibrations, or an impact, thereby increasing a loss within the laser resonator. As a result, there arises such a problem that the output of a transmitted light varies. An adverse affection of the parts being out of alignment generally becomes more prominent as the gain of the laser medium is smaller or as the resonator is longer.

In addition, because it is necessary to control the resonator length in order to obtain the transmitted light of a single frequency, a problem occurs in that the single frequency output is not captured while the control is unstable. Moreover, because the resonator length control is realized by mechanically moving the optical parts within the resonator, there is a problem in that output deterioration arises from the optical parts being out of alignment during the operation. For that reason, the conventional spatial resonator type coherent laser radar device has difficulty in gaining a reputation for high reliability.

To solve a means for solving the above problems, a conventional optical fiber type coherent laser radar device using an optical fiber amplifier for a transmitted light source is disclosed, for example, in FIG. 8 in Proceedings (p. 144 to 146) of 11th Coherent Laser Radar Conference (Malvern, Worcestershire, UK, July 2001).

The optical fiber type coherent laser radar device shown in FIG. 8 includes a laser source 1 that outputs a laser beam that oscillates at a single wavelength to an optical fiber, a first optical coupler 2 of the optical fiber type, an optical modulator 3, an optical fiber amplifier 4, a transmitting/receiving light splitting device 5, a transmitting/receiving optical system 6, a second coupler 7 of the optical fiber type, an optical receiver 8, a signal processor 9, a first polarization controller 10, and a second polarization controller 11.

Here, the transmitting/receiving light splitting device 5 includes a first coupling optical system 21, an optical polarizer 22, a quarter wave plate 23, and a second coupling optical system 24 as shown in FIG. 9.

In the optical fiber type coherent laser radar device shown in FIG. 8, optical parts that pass from the laser source 1 to the transmitting/receiving light splitting device 5 via the optical modulator 3, optical parts that pass from the first optical coupler 2 to the second optical coupler 7 through the second polarization controller 11, and optical parts that pass from the transmitting/receiving light splitting device 5 to the second optical coupler 7 are formed of inline fiber type optical parts, and coupled with each other by means of single mode optical fibers (SMF), respectively.

Next, a description will be given of the operation of the conventional optical fiber type coherent laser radar device. A laser beam from the laser source 1 that oscillates at a signal wavelength (frequency $f_0$) is branched into two by the first optical coupler 2, one of which is used for the local light, and the other of which passes through the first optical coupler 2 and the first polarization controller 10 as a transmitted light, and is then modulated by the optical modulator 3.

Here, the optical modulator 3 is formed of an acousto-optic (AO) element which is driven by pulses, shifts an optical frequency of the laser beam by a frequency $f_1$, modulates a laser beam in the form of pulses, and outputs the laser beam. The pulsed laser beam is applied toward a target by the transmitting/receiving optical system 6 through the transmitting/receiving light splitting device 5 after being amplified by the optical fiber amplifier 4.

The transmitted light that has been applied onto the target is scattered into a received light upon receiving a Doppler shift (Doppler frequency $f_d$) corresponding to a velocity of the target. The received light is split from the transmitted light in the transmitting/receiving light splitting device 5 through the transmitting/receiving optical system 6, and is then coupled with the local light in the second optical coupler 7.

A mixed light of the received light with the local light is detected in heterodyne by the optical receiver 8, and a beat signal having a frequency of a frequency difference $(f_1+f_d)$ between the local light and the received light is outputted from the optical receiver 8. The beat signal is processed in the signal processor 9, and physical information such as a distance to a target, a velocity, a density distribution, or a velocity distribution is measured from the receive intensity of the received light, a round trip time, and a Doppler frequency.

In the transmitting/receiving light splitting device 5, the transmitted light and the received light are split by means of polarization. As shown in FIG. 9, a pulsed laser beam from the optical fiber amplifier 4 is used for the transmitted light, and enters the optical polarizer 22 as a substantially collimated beam by the first coupling optical system 21. The light polarizer 22 is so set as to transmit polarized components that are in parallel with a paper face and reflect polarized components that are perpendicular to the paper face. The transmitted light that has been reflected by the polarizer 22 becomes a linearly polarized light that is perpendicular to the paper face.

Then, the linearly polarized light is transmitted to the transmitting/receiving optical system 6 after being converted into a circularly polarized light by passing through the quarter wave plate 23. Assuming that there is no change in polarization attributable to the scattering of the target, the received light from the transmitting/receiving optical system 6 is a circularly polarized light and is transmitted through the quarter wave plate 23 so as to be converted into a linearly polarized light that is in parallel with the paper face. The received light that has been converted into the linearly polarized light is transmitted through the polarizer 22 and is coupled with an optical fiber that reaches the second optical coupler 7 via the second coupling optical system 24.

To minimize the transmission loss of the transmitted light in the transmitting/receiving light splitting device 5, it is necessary that the transmitted light from the optical fiber amplifier 4 is converted into the linearly polarized light perpendicular to the paper face. To achieve this, an adjustment is made by the first polarization controller 10 so that the transmitted light from the optical fiber amplifier 4 is converted into the linearly polarized light perpendicular to the paper face.

Also, in the optical heterodyne detection, to maximize the detection efficiency, it is necessary to conform the polarized face of the local light to that of the received light. For that reason, an adjustment is made by the second polarization controller 11 so that the polarization face of the local light substantially conforms to the polarization face of the received light.

As described above, in the conventional optical fiber type coherent laser radar device, all of the components except the transmitting/receiving light splitting device 5 and the transmitting/receiving optical system 6 include optical fibers. Thus, the conventional optical fiber type coherent laser radar device is strong in a change in temperature, vibrations, and impact and is high in reliability.

The conventional optical fiber type coherent laser radar device shown in FIG. 8 implements the optical fiber amplifier 4 using a single mode optical fiber for the high output of the transmitted light. In the single mode optical fiber, a light is propagated in a small core of several μm to ten and several μm in diameter. When an output of the transmitted light increases, a power density within the core becomes large, which originates a nonlinear effect such as Brillouin scattering or Raman scattering. Also, damage occurs in an interior of an optical fiber, an end surface of the optical fiber, an optical part within an inline type optical part, or the like. Under the circumstances, an output power of a transmitted light is restricted.

The present invention has been made to solve the above problems, and therefore it is an object of the present invention to provide a coherent laser radar device that realizes a high reliability and a high output of a transmitted light.

DISCLOSURE OF THE INVENTION

A coherent laser radar device according to the present invention includes: a laser source that oscillates a laser beam that is linearly polarized; a first optical coupler that is formed of a polarization maintained type optical element that branches the laser beam from the laser source into two of a local light and a transmitted light; an optical modulator that is formed of a polarization maintained type optical element that modulates the transmitted light that is branched by the first optical coupler; a space type optical amplifier that amplifies the transmitted light which is outputted from the optical modulator over space propagation; a transmitting/receiving optical system that applies the transmitted light which is amplified by the space type optical amplifier toward a target and receives a scattered light from the target; a transmitting/receiving light splitting device that splits the transmitted light that is amplified by the space type optical amplifier and the received light that is scattered by the target; a second optical coupler that is formed of a polarization maintained type optical element that mixes the local light that is branched by the first optical coupler and the received light that is split by the transmitting/receiving light splitting device together; a photodetector that detects heterodyne of a mixed light from the second optical coupler to output a beat signal of the received light; a beat signal amplifier that amplifies the beat signal which is outputted from the photodetector; a signal processing device that processes a signal that is amplified by the beat signal amplifier; and a display device that displays a result processed by the signal processing device, and is characterized in that an optical path that extends from the laser source to the space type optical amplifier through the first optical coupler, an optical path that extends from the transmitting/receiving light splitting device to the photodetector through the second optical coupler, and an optical path that extends from the first optical coupler to the second optical coupler are connected by polarization maintained type single mode optical fibers.

BRIEF DESCRIPTION OF THE DRAWINGS

In the accompanying drawings:

FIG. 5 is an explanatory diagram showing a case in which an gain of the transmitted light is lessened or not amplified at all, which is caused by a timing shift of the pumping light because of pulse jitter when a pulse width of the transmitted light is made substantially identical with that of the pumping light according to a third embodiment of the present invention;

FIG. 6 is a graph representing an example in which a deterioration of the gain is suppressed with the pulse width of the transmitted light being made longer than the pulse width of the pumping light according to the third embodiment of the present invention;

FIG. 7 is a graph representing an example in which a deterioration of the gain is suppressed with the pulse width of the transmitted light being made shorter than the pulse width of the pumping light according to a fourth embodiment of the present invention;

BEST MODE FOR CARRYING OUT THE INVENTION

Hereinafter, respective embodiments of the present invention will be described with reference to the drawings.

FIRST EMBODIMENT

Figure 1:
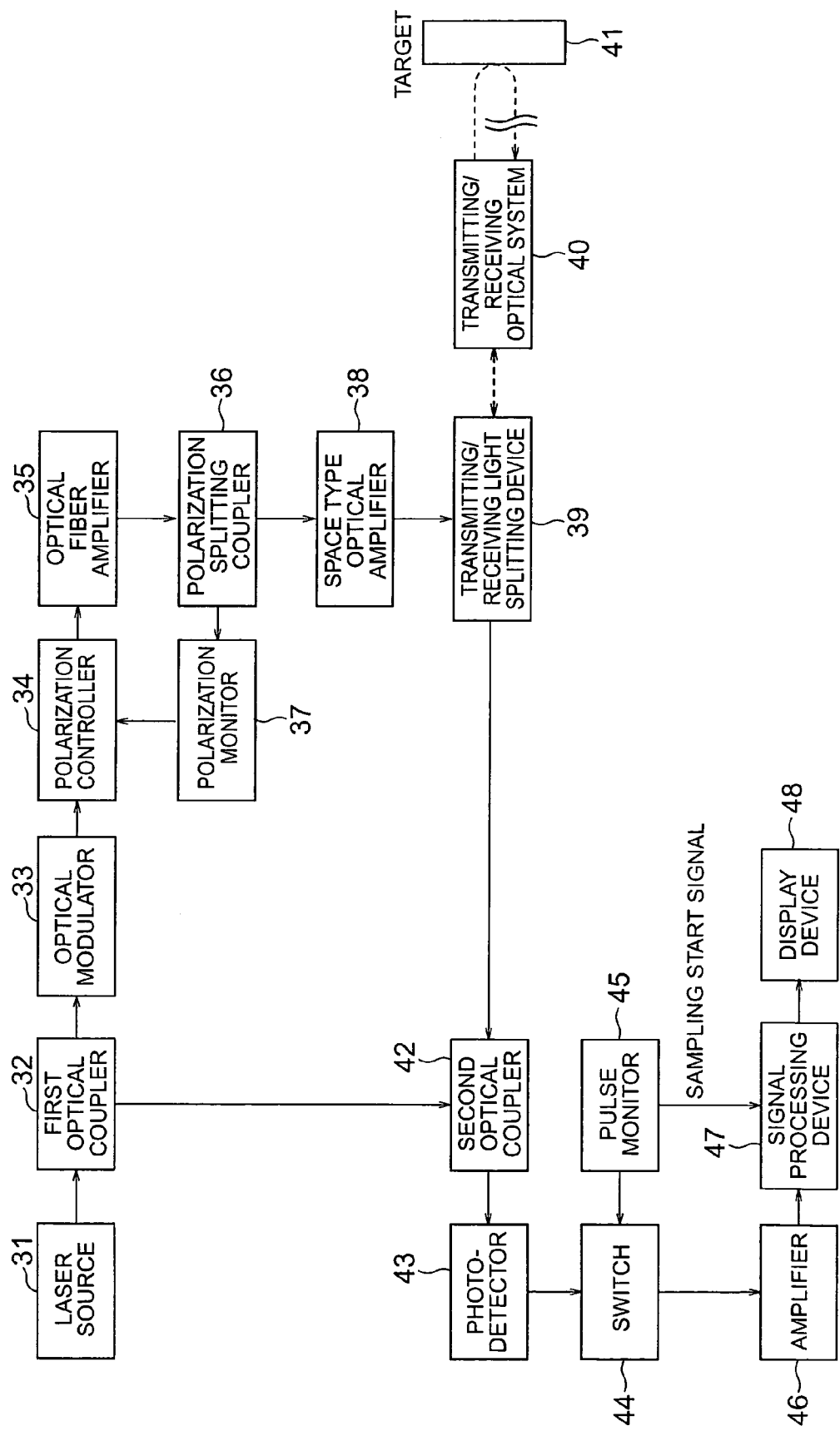
FIG. 1 is a block diagram showing the structure of an optical fiber type coherent laser radar device according to a first embodiment of the present invention.

FIG. 1 is a block diagram showing the structure of an optical fiber type coherent laser radar device according to a first embodiment of the present invention. The optical fiber type coherent laser radar device shown in FIG. 1 includes a laser source 31 that oscillates a laser beam that has been linearly polarized, a first optical coupler 32 that divides the laser beam from the laser source 31 into two lights, a local light and a transmitted light, an optical modulator 33 that modulates the transmitted light from the first optical coupler 32, a polarization controller 34 that adjusts the polarization of the transmitted light that has been outputted from the optical modulator 33 on the basis of a polarization monitor output, an optical fiber amplifier 35 that amplifies the transmitted light that has been outputted from the polarization controller 34, a polarization splitting coupler 36 that splits the transmitted light that has been outputted from the optical fiber amplifier 35 into two linearly polarized components that are orthogonal to each other, a polarization monitor 37 that monitors one output of the polarization splitting coupler 36 and outputs a polarization monitor output to the polarization controller 34, and a space type optical amplifier 38 that amplifies the other output of the polarization splitting coupler 36.

The optical fiber type coherent laser radar device also includes a transmitting/receiving light splitting device 39 that performs splitting for the transmitted light and the received light, a transmitting/receiving optical system 40 that applies a transmitted light toward a target 41 and receives a scattered light from the target 41, a second optical coupler 42 that mixes the local light and the received light together which have been divided by the first optical coupler 32, a photodetector 43 that detects heterodyne from a mixed light from the second optical coupler 42 and outputs a beat signal, a switch 44 that switches an output of the photodetector 43 between a period of time during which the internal scattering of the transmitting/receiving optical system occurs and a period of time during which the scattered light from the target is received, a pulse monitor 45 that monitors the beat signal attributable to the internal scattering which is obtained through the switch 44, an amplifier 46 that amplifies the beat signal of the received light which is obtained through the switch 44, a signal processing device 47 that processes the beat signal of the received light that has been amplified by the amplifier 46, and a display device 48 that displays a processed result that has been obtained by the signal processing device 47.

Figure 2:
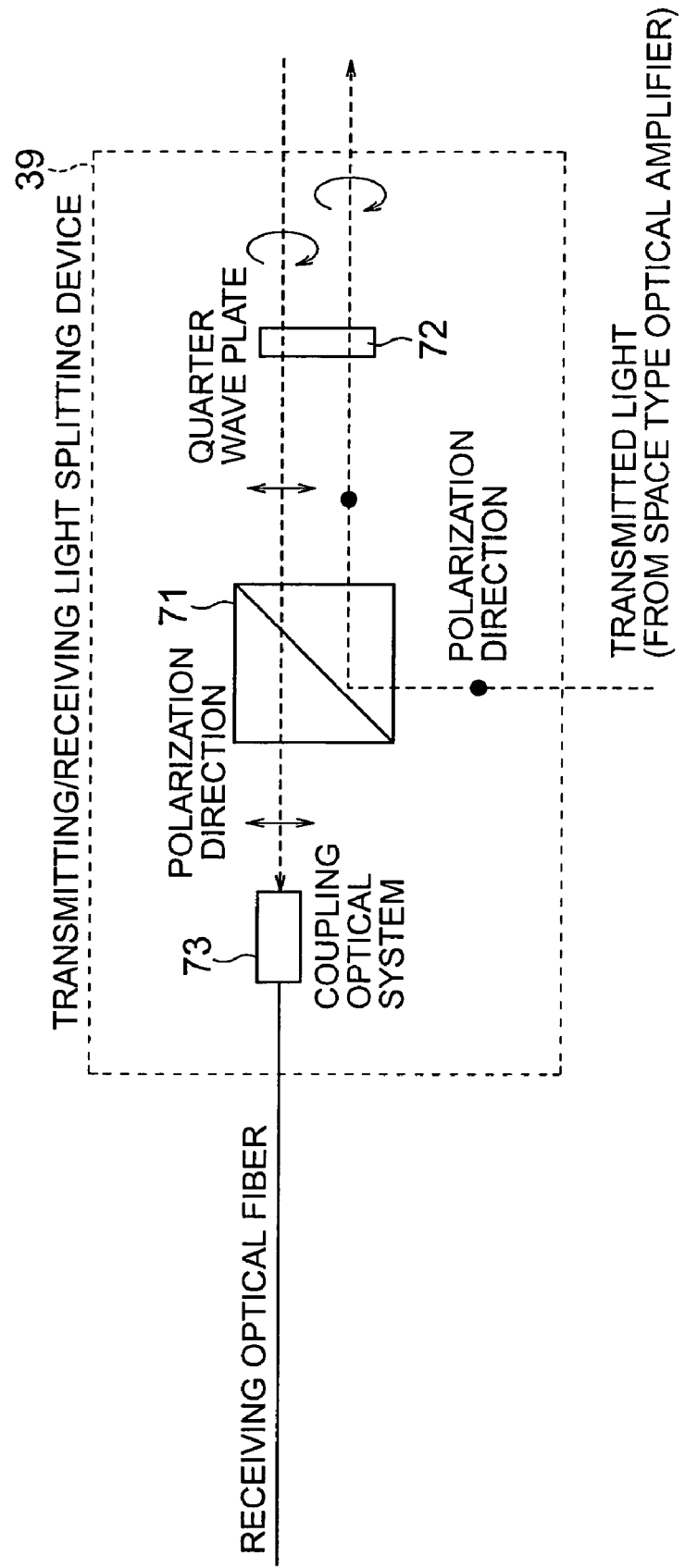
FIG. 2 is a block diagram showing the structure of a transmitting/receiving light splitting device.

In this example, as shown in FIG. 2, the transmitting/receiving light splitting device 39 includes a polarizer 71, a quarter wave plate 72, and a coupling optical system 73.

Moreover, in FIG. 1, the optical modulator 33—the polarization controller 34—the optical fiber amplifier 35 are connected by single mode optical fibers (SMF). The laser source 31—the first optical coupler 32—the optical modulator 33, the optical fiber amplifier 35—the polarization splitting coupler 36—the polarization monitor 37—the space type optical amplifier 38, the transmitting/receiving light splitting device 39—the second optical coupler 42—the detector 43, and the first optical coupler 32—the second optical coupler 42 are connected by polarization maintained type single mode optical fibers (PDF), respectively. Also, the first optical coupler 32, the optical modulator 33, the polarization splitting coupler 36, and the second optical coupler 42 are formed of polarization maintained type optical elements.

Next, the operation will be described. The linearly polarized laser beam that has been outputted from the laser source 31 is branched into two lights, the transmitted light and the heterodyne detection local light, by the first optical coupler 32. The optical modulator 33 modulates the transmitted light that has been branched by the first optical coupler 32. Here, the optical modulator 33 includes, for example, an acousto-optic (AO) element driven by pulses, and shifts an optical frequency of the transmitted light by a frequency $f_1$ as well as modulates the laser beam in the form of pulses and outputs the modulated laser beam.

The transmitted light that has been modulated in the form of pulses by the optical modulator 33 is adjusted in polarized state by the polarization controller 34 and enters the optical fiber amplifier 35. Then, the transmitted light that has been amplified by the optical fiber amplifier 35 enters the space type optical amplifier 38 through the polarization splitting coupler 36. At this time, the space type optical amplifier 38 and the transmitting/receiving light splitting device 39 require a linearly polarized light for the transmitted light.

The optical fiber amplifier 35 normally includes SMF that does not conserve the polarized wave. Therefore, the polarized state of the transmitted light that is outputted from the optical fiber amplifier 35 varies. With the use of the optical fiber amplifier employing PDF that conserves the polarized state, the variation in the polarized state is suppressed, but the optical fiber amplifier using the PDF is normally expensive.

Under the circumstances, the transmitted light that has been outputted from the optical fiber amplifier 35 is split into two polarized components that are orthogonal to each other by the polarization splitting coupler 38, one of output powers is monitored by the polarization monitor 37, and the polarization is controlled by the polarization controller 34 so that the transmitted light that is branched to a polarization monitor 37 side is minimized.

Accordingly, the transmitted light that is outputted from the optical fiber amplifier 35 is adjusted to a linearly polarized light that is branched to the space type optical amplifier 38 side of the polarization coupler 36, and almost all powers are given toward the space type optical amplifier 38.

The space type optical amplifier 38 converts the transmitted light that has been outputted from the optical fiber into a substantially collimated light and emits the collimated light toward a space, and thereafter amplifies the transmitted light. At this time, because the transmitted light is emitted toward the space and then amplified, amplification can be implemented without depending on a power density within the optical fiber, thereby making it possible to amplify the transmitted light to an arbitrary power.

In the space type optical amplifier 38, because the transmitted light has a single frequency, it is necessary to apply a method that can amplify the single frequency. As a method of amplifying the single frequency, it is possible to employ OPA (Optical Parametric Amplification) or direct amplification using a solid state laser medium. In the direct amplification using the solid state laser medium, the amplification of the single frequency is obtainable. However, a solid state laser medium having a gain at a wavelength of 1.4 μm or longer is generally small in the gain and has difficulty in obtaining a larger gain, and therefore it is desirable to use OPA.

The transmitted light that has been amplified by the space type optical amplifier 38 is applied onto a target by the transmitting/receiving optical system 40 through the transmitting/receiving light splitting device 39. The transmitting/receiving light splitting device 39 splits the light in the transmitted light and the received light by means of polarization.

In FIG. 2, the transmitted light that has been amplified by the space type optical amplifier 38 is propagated in the space and enters the polarizer 71. The polarizer 71 is so set as to transmit polarized components that is in parallel with the paper face and to reflect polarized components that are perpendicular to the paper face. The transmitted light that has been reflected by the polarizer 71 becomes a linearly polarized light perpendicular to the paper face. In addition, the quarter wave plate 72 is arranged such that a crystal axis is at 45° with respect to a polarization direction of the transmitted light, and the transmitted light is transmitted through the quarter wave plate 72 so as to be converted into a circularly polarized light before being sent to the transmitting/receiving optical system 40.

The received light that has been scattered at the target 41 is subjected to Doppler shift (Doppler frequency $f_d$) corresponding to a velocity of the target and received by the transmitting/receiving optical system 40. Assuming that there is no change in polarization attributable to the scattering of the target, the received light from the transmitting/receiving optical system 40 is a circularly polarized light and is transmitted through the quarter wave plate 72 so as to be converted into a linearly polarized light that is in parallel with the paper face. The received light that has been converted into the linearly polarized light is transmitted through the polarizer 71 and is coupled via the coupling optical system 73 with an optical fiber that reaches the second optical coupler 42.

The received light is coupled with the local light that has been branched by the first optical coupler 32 in the second optical coupler 42. A mixed light of the received light with the local light is detected in heterodyne by the optical receiver 43, and a beat signal having a frequency of a frequency difference between the local light and the received light is outputted therefrom.

At this time, internally scattered lights from the optical parts within the transmitting/receiving light splitting device 39 and within the transmitting/receiving optical system 40, in addition to the received light from the target, enter the photodetector 43. Because the internally scattered light is larger in intensity than the received light, when a beat signal of the internally scattered light enters the amplifier 46 and the signal processing device 47 as it is, saturation that is restricted by an electric circuit occurs, and the beat signal of the received light cannot be received for a relaxation time until the saturation is relaxed, thereby making it difficult to conduct a short-distance measurement. Also, in the case where the electric circuit is so adjusted as not to develop the saturation, a significant dynamic range is required in taking in the beat signal by the signal processing device 47, and thus the signal processing device 47 becomes complicated and expensive.

Under the circumstances, the beat signal of the internally scattered light and the beat signal are split in terms of time, and only the beat signal of the received signal is amplified by the amplifier 46 and is so adjusted as to match the dynamic range of the signal processing device 47. The beat signal of the internally scattered light that has been split by the switch 44 is inputted to the pulse motor 45. Since the internally scattered light is observed at a time when the transmitted light is outputted, the internally scattered light is used as a sampling start signal that starts A/D conversion. This allows the effect of pulse jitter in the space type optical amplifier 38, an operation delay attributable to other optical elements or the like to be eliminated, thereby making it possible to detect the time when the transmitted light is outputted with precision.

The signal processing device 47 starts A/D sampling of the beat signal of the received light in accordance with a sampling start signal obtained from the pulse motor 45. The beat signal that has been subjected to A/D sampling is processed by the signal processing device 47 so that physical information such as a distance to the target, a velocity, a density distribution, or a velocity distribution is extracted from the receive intensity of the received light, a round trip time, and a Doppler frequency, and the physical information is then displayed on the display device 48.

Accordingly, the optical fiber type coherent laser radar device according to the first embodiment can realize a high output that is not restricted by the nonlinear effect within the optical fiber or damages to the optical parts since the output power of the transmitted light can be arbitrarily amplified by the space type optical amplifier 38.

Also, since the beat signal of the internally scattered light is split by the switch 44 and then detected by the pulse monitor 45, it is possible to prevent the saturation of an electric circuit in the amplifier 46 or the signal processing device 47. This allows an observation to be conducted immediately after the internally scattered light has been terminated, thereby enabling a short-distance measurement.

Moreover, since a change in the polarization which is attributable to the optical fiber amplifier 35 is suppressed by the polarization splitting coupler 36, the polarization monitor 37, and the polarization controller 34, an optical fiber amplifier using SMF can be employed. Also, the device can be manufactured inexpensively, and a gain that is required by the space type optical amplifier 38 is reduced, thereby making it possible to obtain a stable transmitted light output.

Here, it is possible that an optical system portion that includes the space type optical amplifier 38, the transmitting/receiving light splitting device 39, and the transmitting/receiving optical system 40 is separated from a main body that includes other optical parts, and optical fibers each having an arbitrary length are connected between the polarization splitting coupler 36 and the space type optical amplifier 38 and between the transmitting/receiving light splitting device 39 and the second optical coupler 42. This structure makes it possible to enhance the degree of freedom of installation such that only the optical system is located outdoors and the main body is set in a room that is excellent in environmental conditions.

In order to amplify the transmitted light that enters the space type optical amplifier 38, there are used the polarization controller 34, the optical fiber amplifier 35, the polarization splitting coupler 36, and the polarization monitor 37. When a gain of the space type optical amplifier 38 is satisfactorily high, PDF may be connected directly between the optical modulator 33 and the space type optical amplifier 38. This arrangement makes it possible to reduce a power density within the optical fiber, to further suppress the nonlinear effect and the damage, and to manufacture the device inexpensively because the number of structural parts is reduced.

SECOND EMBODIMENT

Figure 3:
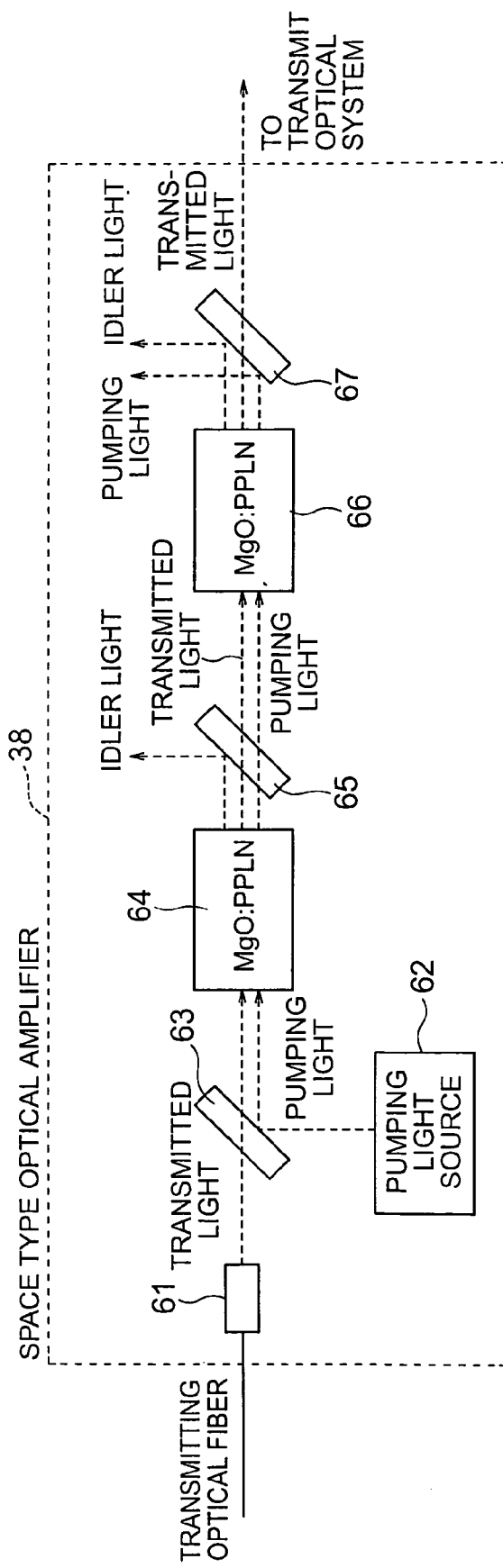
FIG. 3 is a block diagram showing the structure of a space type optical amplifier by using an OPA according to a second embodiment of the present invention.

FIG. 3 is a block diagram showing the structure of a space type optical amplifier by using an OPA (Optical Parametric Amplification) according to a second embodiment of the present invention. As shown in FIG. 3, the space type optical amplifier 38 includes a collimating optical system 61, an pumping light source 62 that outputs a pulsed pumping light, a dichroic mirror 63 that couples the transmitted light with the pumping light, a first nonlinear material 64 that converts a power of the pumping light into a power of the transmitted light due to the nonlinear effect, a first splitting mirror 65 that reflects an idler light that has been generated in OPA and transmits the transmitted light and the pumping light, a second nonlinear material 66 that converts the power of the pumping light into the power of the transmitted light due to the nonlinear effect, and a second splitting mirror 67 that reflects the idler light and the pumping light and transmits only the transmitted light.

The OPA is a method in which a power of the pumping light that is short in wavelength is transferred to two wavelengths (signal light, idler light) which are longer in wavelength by means of the nonlinear effect of a nonlinear material, thereby amplifying the signal light. In this situation, when the transmitted light enters the nonlinear material as the signal light, the transmitted light is amplified to generate the idler light. Assuming that the pumping light wavelength, the signal light wavelength, and the idler light wavelength are assigned $\lambda p$, $\lambda s$, and $\lambda i$, respectively, the following relationship is satisfied according to the energy conservation law.

$$1/\lambda p = 1/\lambda s + 1/\lambda i,$$

For example, when $\lambda s=1.54$ μm and $\lambda p=1.03$ μm, $\lambda i=3.11$ μm is satisfied.

In addition, to amplify the signal light, it is necessary to satisfy conditions (phase matching conditions) where the propagation speeds of the signal light, pumping light, and the idler light are identical with each other. Specifically, it is necessary that the refractive indexes of three wavelengths are identical with each other. In the case where the signal light of 1.5 μm band is amplified, there is employed, as the nonlinear material, single crystal of $LiNbO_3$(LN) or KTP, other than PPLN (Periodic Poled LN) or PPKTP (Periodic Poled KTP) that has the axial orientation of $LiNbO_3$ or KTP periodically reversed, or MgO:PPLN resulting from doping PPLN with magnesium (Mg).

In case of single crystal, phase matching is adjusted according to an incident angle (phase matching angle) to the nonlinear material and the temperature, and in case of PPLN, MgO:PPLN, and PPKTP, the phase matching is adjusted according to the reverse period and the temperature. In OPA using a nonlinear material whose axial orientation has been periodically reversed, the tolerance of an incident angle of the laser beam to crystal is large, and OPA that is high in stability is enabled. In addition, PPLN is large in the nonlinear effect.

However, the normal PPLN is likely to get a damage attributable to a light (photo refractive damage) and is therefore required to keep the temperature to a higher temperature for the purpose of preventing the damage. MgO:PPLN has the nonlinear effect as much as PPLN does. In addition, it is desirable to use MgO:PPLN as the nonlinear material because it is unlikely to get the damage attributable to the light and OPA at a room temperature can be conducted.

Also, the laser device used as the pumping light source 62 can be realized by allowing a laser medium that oscillates at a wavelength of 1 μm band such as Nd:YAG, Nd:YLF, $Nd:YVO_4$, or Yb:YAG to operate due to a Q switch. Those laser media are high in the gain as compared with a laser medium that oscillates at 1.4 μm or longer such as Er or Yb:Glass, and can generate an pumping light with a high efficiency. Also, because of the high gain, the impact of an increase in a resonator loss caused by alignment shift or the like is small, thereby making it possible to realize a high reliability.

Next, the operation will be described. The transmitted light that has been outputted as a substantially collimated light from the collimating optical system 61 is coupled with the pumping light that has been outputted from the pumping light source 62 by the dichroic mirror 63, and then enters the first nonlinear material 64. In the first nonlinear material 64, a power of the pumping light is transferred to the transmitted light, the transmitted light is amplified, and the idler light is generated. The transmitted light and the pumping light that have been outputted from the first nonlinear material 64 are split from the idler light by the first splitting mirror 65, and then enters the second nonlinear material 66. The transmitted light is further amplified by the second nonlinear material 66 and then outputted. The transmitted light that has been emitted from the second nonlinear material 66 is split from the pumping light and the idler light by means of the second splitting mirror 67, and is then emitted to the transmitting/receiving light splitting device 39.

Figure 4:
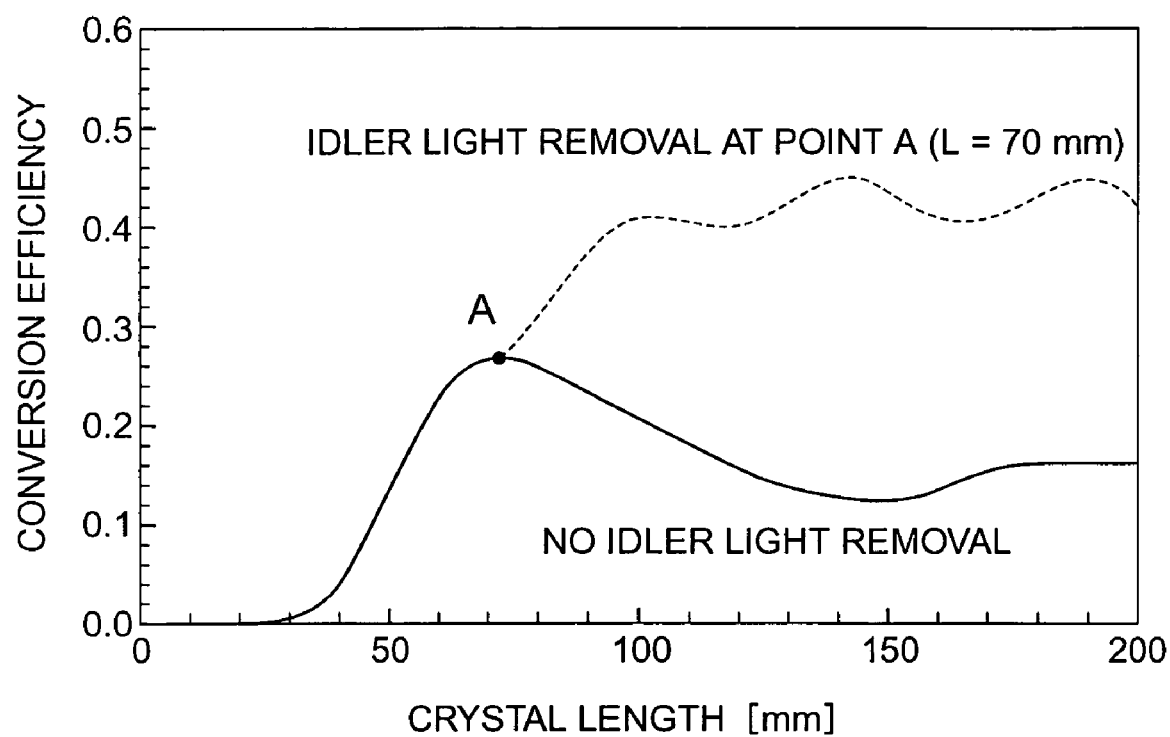
FIG. 4 is a graph representing a relationship between a conversion efficiency of a power from an pumping light to a transmitted light and a crystal length of a nonlinear material at the time of using MgO:PPLN, MgO (magnesium oxide) doped PPLN as the nonlinear material.
Figure 8:
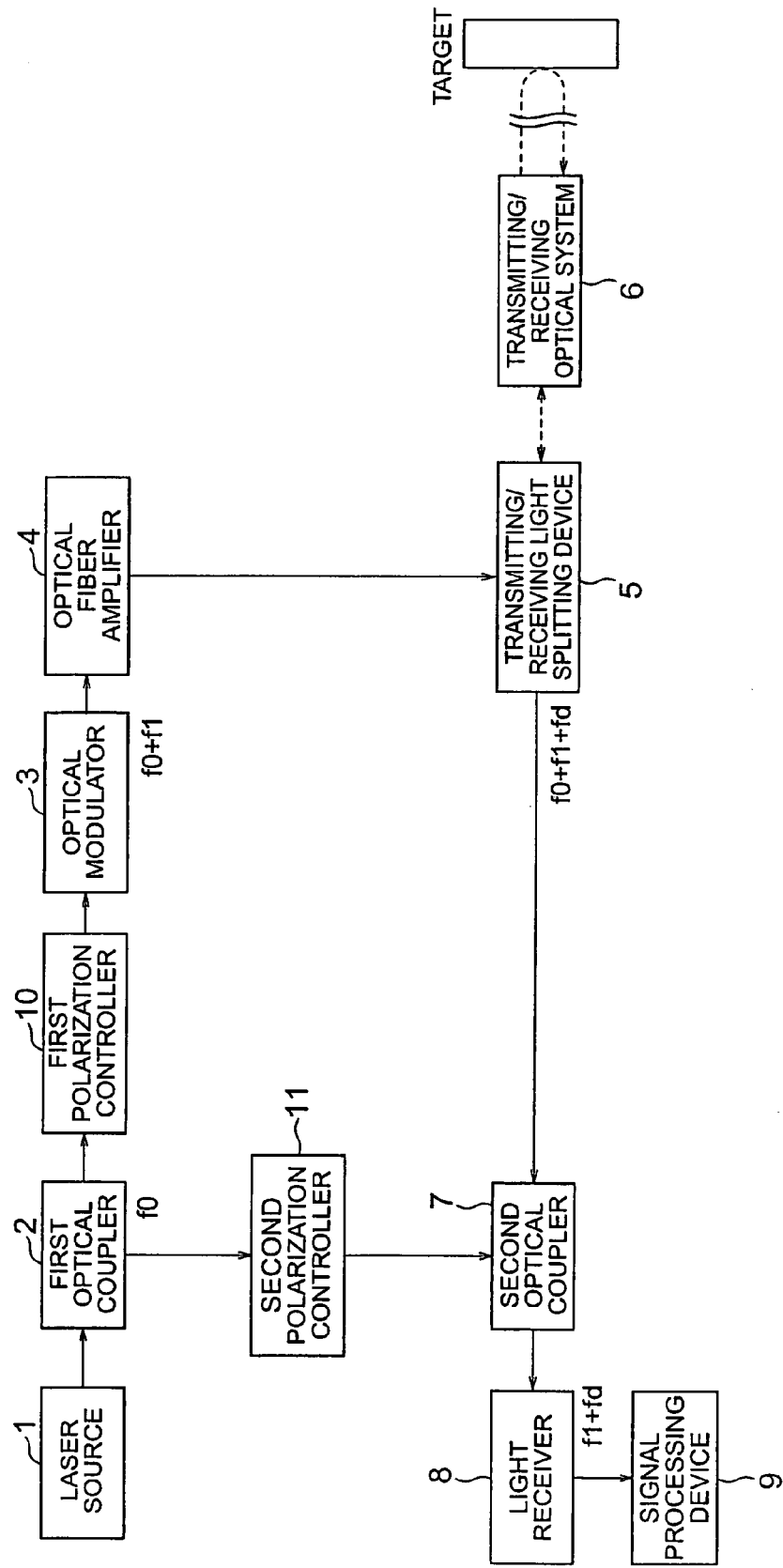
FIG. 8 is a block diagram showing the structure of a conventional optical fiber type coherent laser radar.
Figure 9:
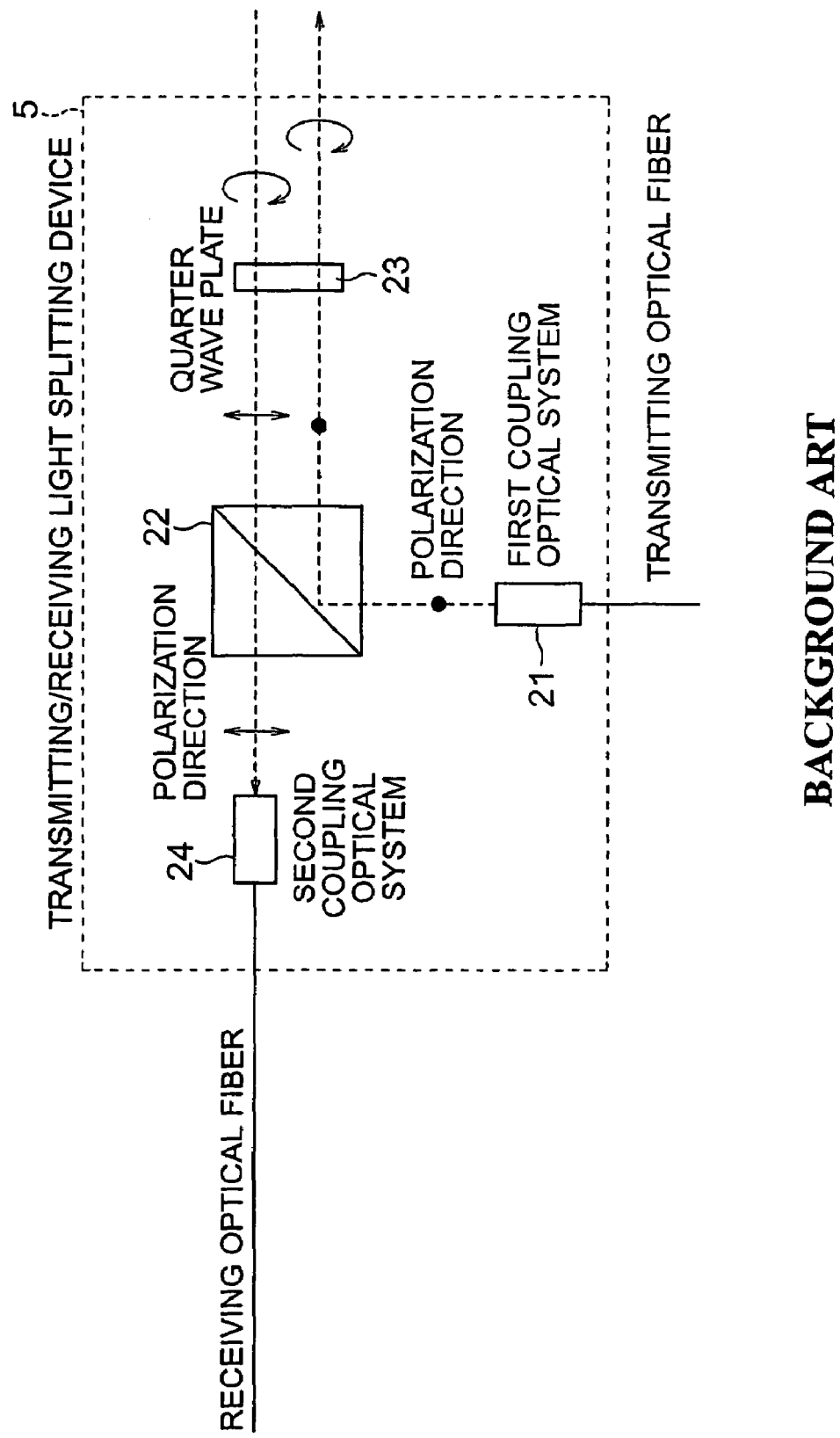
FIG. 9 is a block diagram showing the structure of a transmitting/receiving light splitting device shown in FIG. 8.

Here, FIG. 4 shows a relationship between the conversion efficiency of a power from the pumping light to the transmitted light and a crystal length of the nonlinear material at the time of using MgO:PPLN as a nonlinear material. A solid line represents a conversion efficiency when the crystal length is changed by one MgO:PPLN, whereas a broken line represents a conversion efficiency in the case where the transmitted light again enters the nonlinear material after the idler light has been removed by a length that allows the maximum conversion efficiency to be obtained in a first nonlinear material.

In the case where one nonlinear material is used, inverse conversion where the transmitted light and the idler light are again converted into the pumping light wavelength occurs as the crystal length is longer, and the power of the transmitted light is lowered. On the other hand, when the idler light is removed in a middle of the course and the transmitted light again enters the nonlinear crystal, the inverse conversion is suppressed, obtaining a higher conversion efficiency. In the above structure, two nonlinear materials are employed. However, it is possible that three or more nonlinear materials are arranged, and splitting mirrors that remove the idler light are inserted between the respective nonlinear materials. It is apparent that the same effects are obtained even if the first splitting mirror 65 and the second splitting mirror 67 that are opposite in the transmission characteristics and the reflection characteristics to each other are employed.

In the OPA structure that removes the idler light in a middle of the course by means of a plurality of such nonlinear materials, since inverse conversion of the transmitted light and the idler light into the pumping light can be suppressed, it is possible to obtain a space type optical amplifier that is high in the gain of the transmitted light.

Here, in the case where the transmitted light is of a single frequency, and the pumping light is not of the single frequency (wavelength $\lambda p_1, \lambda p_2, \ldots$), a relationship of $1/\lambda p_1 = 1/\lambda s + 1/\lambda i_1$, $1/\lambda p_2 = 1/\lambda s + 1/\lambda i_2$, ... is satisfied according to the energy conservation law, and the idler lights of plural wavelengths are developed. In this situation, when a wavelength that satisfies, for example, $1/\lambda p_1 = 1/\lambda s' + 1/\lambda i_2$ meets the phase matching conditions, the signal light of the wavelength $\lambda s'$ is generated. Because there are a large number of similar combinations, a signal light that is different in the wavelength is caused to be superimposed on the transmitted light. In the case where the signal light different in the wavelength is generated, the gain of the transmitted light is lessened, and a signal light that is close in the wavelength to the transmitted light causes noises in detection of heterodyne in the photodetector, and deteriorates the characteristics of the device. Therefore, it is desirable that the pumping light source 62 is unified in the frequency.

For the purpose of unifying the frequency of the pumping light source 62, there are a method in which the local light and the laser oscillating wavelength are made to coincide with each other by means of an injection seeding method and a resonator length control, a method in which the oscillation wavelength is restricted with the provision of etalon within the resonator, and so on. In case of the pumping light source of OPA, because it is unnecessary to make the local light and the wavelength coincide with each other, and it is satisfactory to obtain the single frequency oscillation, the frequency unification of the pumping light source can be realized by using etalon that is simple in the device structure.

As described above, when the pumping light source is unified in the frequency, it is possible to structure a space type optical amplifier that does not generate noises in detection of heterodyne in the photodetector and is high in the reliability.

THIRD EMBODIMENT

In OPA, the pumping light and the transmitted light are pulses, and as shown in FIG. 5, only when the pumping light (refer to FIG. 5(b)) and the transmitted light (refer to FIG. 5(a)) are superimposed in terms of time on each other within crystal, the transmitted light is amplified (refer to FIG. 5(c)). Because the transmitted light pulses the laser source of a CW output by the optical modulator, a variation (pulse jitter) of the timing of the pulse depends on the electric circuit. On the other hand, in the case where a solid state laser is used for the pumping light source, and the Q switch operation is conducted, a large pulse jitter occurs as compared with the transmitted light which is attributable to a change in the temperature environments or the exciting state. Accordingly, when the transmitted light and the pumping light are made identical in the pulse width with each other, the gain may be deteriorated or the transmitted light may not be amplified at all due to the shift of timing of the pumping light which is attributable to the pulse jitter.

In the third embodiment, a method for solving the above problem will be described. FIG. 6 is a diagram showing a pulse width relationship between the transmitted light and the pumping light according to the third embodiment of the present invention. FIG. 6(a) shows a pulse time waveform of the transmitted light, and FIG. 6(b) shows a pulse time waveform of the pumping light. The pulse width of the transmitted light is equal to the pulse jitter of the pumping light or wider than the pulse jitter, and even if pulse jitter is developed in the pumping light, the pumping light is superimposed in terms of time on the transmitted light.

With the above structure, even in the case where the pulse jitter is developed in the pumping light, it is possible to structure a space type optical amplifier that suppresses the deterioration of the gain and is high in the efficiency.

Because the pulse shape of the transmitted light amplified in the space type optical amplifier is primarily determined in accordance with the pulse shape of the pumping light, the pulse jitter of the pumping light is developed in the transmitting light. When the pulse jitter starts the A/D sampling of the beat signal of the received light in accordance with a sampling start signal obtained from the pulse monitor 45 in FIG. 1 as shown in the first embodiment, an error in the measurement which is caused by the pulse jitter does not occur.

FOURTH EMBODIMENT

In the above third embodiment, the pulse width of the transmitted light is set to be longer than the pulse width of the pumping light, however, the pulse width of the pumping light (refer to FIG. 7(b)) may be set to be longer than the pulse width of the transmitted light (refer to FIG. 7(a)) to obtain the transmitted light that has been amplified (refer to FIG. 7(c)).

With the above setting, the pulse shape of the transmitted light is primarily determined in accordance with the pulse shape of the transmitted light that has not yet entered the space type optical amplifier. Because the space resolution of a coherent laser is in proportion to the pulse width of the transmitted light, and a wind velocity measuring precision is in proportion to an inverse number of the pulse width, it is possible to perform measurement according to diverse requirements while varying the pulse width of the transmitted light from the coherent optical system 61 in such a manner that the pulse width of the transmitted light is shortened in a measurement that requires the space resolution and the pulse width of the transmitted light is lengthened in a measurement that requires the wind velocity measurement precision.

INDUSTRIAL APPLICABILITY

As has been described above, according to the present invention, there can be obtained a coherent laser radar device that realizes a high reliability and the high output of a transmitted light.

The invention claimed is:
1. A coherent laser radar device, comprising:
   a laser source that oscillates a laser beam which is linearly polarized;
   a first optical coupler that is formed of a polarization maintained type optical element that branches the laser beam from the laser source into two lights, a local light and a transmitted light;

an optical modulator that is formed of a polarization maintained type optical element that modulates the transmitted light that is branched by the first optical coupler;

a polarization controller that adjusts the polarization of the transmitted light that is outputted from the optical modulator such that a polarization monitor output becomes minimum;

an optical fiber amplifier that amplifies the transmitted light which is outputted from the polarization controller;

a polarization splitting coupler that splits the transmitted light which is amplified by the optical fiber amplifier to two linearly polarized components which are orthogonal to each other;

a space type optical amplifier that amplifies the transmitted light which is outputted from the optical modulator over space propagation;

a transmitting/receiving optical system that applies the transmitted light which is amplified by the space type optical amplifier toward a target and receives a scattered light from the target;

a transmitting/receiving light splitting device that splits the transmitted light that is amplified by the space type optical amplifier and the received light that is scattered by the target;

a second optical coupler that is formed of a polarization maintained type optical element that mixes the local light that is branched by the first optical coupler and the received light that is split by the transmitting/receiving light splitting device together;

a photodetector that detects heterodyne of a mixed light from the second optical coupler to output a beat signal of the received light;

a beat signal amplifier that amplifies the beat signal which is outputted from the photodetector;

a signal processing device that processes a signal that is amplified by the beat signal amplifier; and a display device that displays a result processed by the signal processing device, characterized in that an optical path that extends from the laser source to the space type optical amplifier through the first optical coupler, an optical path that extends from the transmitting/receiving light splitting device to the photodetector through the second optical coupler, and an optical path that extends from the first optical coupler to the second optical coupler are connected by polarization maintained type single mode optical fibers.

2. The coherent laser radar device according to claim 1, further comprising:

the polarization monitor that monitors one of the polarized components which are split by the polarization splitting coupler to transmit the polarization monitor output to the polarization controller, characterized in that:

the space type optical amplifier amplifies the other polarized component which is split by the polarization splitting coupler over space propagation as the transmitted light; and an optical path that extends from the optical modulator to the optical fiber amplifier through the polarization controller in the optical path that extends from the first optical coupler to the space type optical amplifier is connected by a signal mode optical fiber.

3. The coherent laser radar device according to claim 1, further comprising:

a switch that switches over the output of the photodetector between a period of time during which internal scattering of the transmitting/receiving optical system is generated and a period of time during which the scattered light from the target is received; and a pulse monitor that monitors a signal which is obtained through the switch and attributable to the internal scattering to output a start signal, characterized in that:

the beat signal amplifier amplifies the beat signal of the received signal that is obtained through the switch; and the signal processing device starts reading of the beat signal that is amplified by the beat signal amplifier on the basis of a start signal that is obtained by the pulse monitor.

4. The coherent laser radar device according to claim 1, further comprising:

a polarization controller that adjusts the polarization of the transmitted light that is outputted from the optical modulator such that the polarization monitor output becomes minimum;

an optical fiber amplifier that amplifies the transmitted light that is outputted from the polarization controller;

a polarization splitting coupler that splits the transmitted light that is amplified by the optical fiber amplifier to two linearly polarized components that are orthogonal to each other; and a polarization monitor that monitors one of the polarized components which are split by the polarization splitting coupler to transmit a polarization monitor output to the polarization controller, characterized in that:

the space type optical amplifier amplifies the other polarized component which is split by the polarization splitting coupler over space propagation as the transmitted light; and an optical path that extends from the optical modulator to the optical fiber amplifier through the polarization controller in the optical path that extends from the first optical coupler to the space type optical amplifier is connected by a signal mode optical fiber, and the coherent laser radar device further comprising:

a switch that switches over the output of the photodetector between a period of time during which internal scattering of the transmitting/receiving optical system is generated and a period of time during which the scattered light from the target is received; and a pulse monitor that monitors a signal which is obtained through the switch and attributable to the internal scattering to output a start signal, characterized in that:

the beat signal amplifier amplifies the beat signal of the received signal that is obtained through the switch; and the signal processing device starts reading of the beat signal that is amplified by the beat signal amplifier on the basis of a start signal that is obtained by the pulse monitor.

5. The coherent laser radar device according to claim 1, characterized in that the space type optical amplifier comprises:

a collimating optical system that collimates the transmitted light which is outputted from the polarization maintained single mode fiber;

an pumping light source that outputs a pulsed pumping light;

a dichroic mirror that combines the transmitted light that is outputted from the collimating optical system with the pumping light that is outputted from the pumping light source; and a nonlinear material having an Optical Parametric Amplification (OPA) function that converts a power of the pumping light into a power of the transmitted light and amplifies the transmitted light upon receiving incidence of the transmitted light and the pumping light that are combined together by the dichroic mirror.

6. The coherent laser radar device according to claim 5, characterized in that the space type optical amplifier further comprises two or more nonlinear materials as the nonlinear material, and a split mirror that removes an idler light between the respective nonlinear materials.

7. The coherent laser radar device according to claim 5, characterized in that Periodic Poled $LiNbO_3$ (MgO:PPLN) added with magnesium is used as the nonlinear material.

8. The coherent laser radar device according to claim 5, characterized in that a pulse width of the transmitted light from the collimating optical system is made longer than a pulse width of the pumping light from the pumping light source.

9. The coherent laser radar device according to claim 5, characterized in that a pulse width of the transmitted light from the collimating optical system is made shorter than a pulse width of the pumping light from the pumping light source.

10. The coherent laser radar device according to claim 9, characterized in that a pulse width of the transmitted light from the collimating optical system is made variable.

* * * * *